United States Patent
Friesen et al.

(10) Patent No.: US 12,024,140 B2
(45) Date of Patent: Jul. 2, 2024

(54) METHOD FOR CALIBRATING THE ORIENTATION OF AN ACCELERATION SENSOR PROVIDED IN A VEHICLE

(71) Applicant: KNORR-BREMSE SYSTEME FUR SCHIENEN-FAHRZEUGE GMBH, Munich (DE)

(72) Inventors: Ulf Friesen, Neubiberg (DE); Ralf Furtwängler, Munich (DE); Dirk Deeken, Munich (DE)

(73) Assignee: KNORR-BREMSE SYSTEME FUR SCHIENEN-FAHRZEUGE GMBH (DE)

( * ) Notice: Subject to any disclaimer, the term of this patent is extended or adjusted under 35 U.S.C. 154(b) by 65 days.

(21) Appl. No.: 17/622,789

(22) PCT Filed: Jun. 15, 2020

(86) PCT No.: PCT/EP2020/066460
§ 371 (c)(1),
(2) Date: Dec. 24, 2021

(87) PCT Pub. No.: WO2020/260049
PCT Pub. Date: Dec. 30, 2020

(65) Prior Publication Data
US 2022/0242380 A1 Aug. 4, 2022

(30) Foreign Application Priority Data

Jun. 25, 2019 (DE) ...................... 10 2019 117 089.3

(51) Int. Cl.
*B60T 13/66* (2006.01)
*G01C 25/00* (2006.01)
(Continued)

(52) U.S. Cl.
CPC .......... *B60T 13/662* (2013.01); *B60T 13/665* (2013.01); *G01C 25/005* (2013.01); *G01P 15/18* (2013.01); *G01P 21/00* (2013.01)

(58) Field of Classification Search
CPC ... B60T 13/662; B60T 13/665; G01C 25/005; G01P 15/18; G01P 21/00; B60Y 2200/33
See application file for complete search history.

(56) References Cited

U.S. PATENT DOCUMENTS 6,115,668 A * 9/2000 Kaneko .................. G01C 21/28
73/178 R
6,532,419 B1 3/2003 Begin et al.
(Continued)

FOREIGN PATENT DOCUMENTS

DE 102005033237 A1 1/2007
DE 102011052545 A1 2/2013
(Continued)

OTHER PUBLICATIONS

International Search Report corresponding to PCT/EP2020/066460 dated Oct. 5, 2020.
(Continued)

*Primary Examiner* — Lisa M Caputo
*Assistant Examiner* — Cynthia L Davis
(74) *Attorney, Agent, or Firm* — Barnes & Thornburg LLP (57) ABSTRACT

Disclosed embodiments relate to a method for calibrating a coordinate system of a multi-axis deceleration sensor in a rail vehicle, including calibrating the vertical axis of the sensor to the vertical axis of the vehicle, measuring the acceleration along the longitudinal and transverse axis of the sensor during a braking process of the rail vehicle at a low speed and at a standstill over a time curve, determining an offset vector at a standstill, the offset vector consisting partly
(Continued)

of a component in the longitudinal direction and partly of a component in the transverse direction of the sensor and representing the influence of the gravitational acceleration on the measured acceleration of the rail vehicle, and ascertaining at least one resulting acceleration vector of the coordinate system of the sensor about the vertical axis of the sensor such that the at least one resulting acceleration vector faces the vehicle longitudinal direction.

16 Claims, 3 Drawing Sheets

(51) Int. Cl.
  *G01P 15/18* (2013.01)
  *G01P 21/00* (2006.01)

(56) References Cited

U.S. PATENT DOCUMENTS

| | | | |
|---|---|---|---|
| 2008/0208501 A1 | 8/2008 | Fiedler et al. | |
| 2010/0318257 A1* | 12/2010 | Kalinadhabhotla | G01P 21/00 |
| | | | 701/31.4 |
| 2011/0202225 A1* | 8/2011 | Willis | G01C 25/005 |
| | | | 702/85 |
| 2013/0081442 A1 | 4/2013 | Basir et al. | |
| 2015/0094977 A1 | 4/2015 | Dobra et al. | |
| 2016/0047836 A1 | 2/2016 | Jones et al. | |
| 2016/0109270 A1 | 4/2016 | Zabegaev | |
| 2018/0313868 A1* | 11/2018 | Sljivar | G01P 21/00 |
| 2019/0043277 A1* | 2/2019 | Jundt | G07C 5/0808 |
| 2020/0193740 A1* | 6/2020 | Sabina | G01P 1/127 |

FOREIGN PATENT DOCUMENTS

| | | |
|---|---|---|
| DE | 102015110053 A1 | 12/2016 |
| DE | 102015115282 A1 | 3/2017 |
| EP | 2853901 A1 | 4/2015 |
| KR | 20080002705 A | 1/2008 |
| KR | 20130053882 A * | 5/2013 |
| WO | 2006026751 A1 | 3/2006 |
| WO | 2017042138 A1 | 3/2017 |
| WO | 2018002893 A1 | 1/2018 |
| WO | 2019101526 A1 | 5/2019 |

OTHER PUBLICATIONS

1 Australian Office Action corresponding to Australian Application No. 2020304705 dated Mar. 23, 2024.
Korean Office Action corresponding to KR 10-2022-7000716 dated Jun. 30, 2023.

* cited by examiner

METHOD FOR CALIBRATING THE ORIENTATION OF AN ACCELERATION SENSOR PROVIDED IN A VEHICLE

CROSS REFERENCE AND PRIORITY CLAIM

This patent application is a U.S. National Phase of International Patent Application No. PCT/EP2020/066460 filed Jun. 15, 2020, which claims priority to German Patent Application No. 10 2019 117 089.3, the disclosure of which being incorporated herein by reference in their entireties.

FIELD

Disclosed embodiments relate to a method for calibrating the orientation of an acceleration sensor provided in a vehicle, in particular a method for calibrating the orientation of a coordinate system of a multiaxis acceleration sensor in a rail vehicle, a device which is configured to carry out the method, and a computer program product which is configured to carry out the method automatically.

BACKGROUND

In modern vehicles, in particular rail vehicles, deceleration regulators are used to be able to ensure economical, comfortable, and safe braking. Such regulators are described, for example, in patent documents DE 10 2015 110 053 A1 or DE 10 2011 052 545 and require an ACTUAL deceleration signal of the vehicle in the vehicle longitudinal direction to regulate the deceleration.

Such a signal can be ascertained, for example, on the basis of acceleration sensors which are installed in the trains. The acceleration in the vehicle longitudinal direction possibly has to be corrected by the part of the downhill slope force in the case of inclined tracks. A detection of the longitudinal acceleration of the vehicle can be carried out here by single-axis sensors oriented exactly in the vehicle longitudinal direction.

However, the installation of exactly aligned sensors is very complex, restrictive with respect to the positioning of the sensors, and uncomfortable. Alternatively to single-axis sensors, multiaxis acceleration sensors (in particular two-axis or three-axis sensors) can also be used. In particular if sensors having at least three axes are used, they can be installed arbitrarily oriented in the vehicle. Such sensors are integrated, for example, in a control unit (brake controller), which can be arranged arbitrarily in its orientation in the vehicle.

Multiaxis sensors have the disadvantage, however, that they first have to be calibrated on the coordinate system of the vehicle to be able to determine the accelerations exactly in the longitudinal or transverse direction of the train. Such a calibration is preferably carried out on a leveled track section which cannot have curve radii, raised tracks (transverse inclination of the tracks), or uphill slopes. In this way, components in the longitudinal or transverse direction of the sensor which occur due to gravitational acceleration on uneven tracks in the longitudinal or transverse acceleration of the vehicle and would thus mean corruption of the calibration can be precluded. Arbitrary real, apparently level and straight route sections in which curve radii, raised tracks, and uphill slopes or downhill slopes cannot be precluded, however, are therefore not suitable for a calibration of the sensor. Due to the fact that a calibration of the sensor on the vehicle longitudinal axis can only be carried out during a dynamic movement of the vehicle, it is moreover necessary for the leveled track section to be significantly longer than a vehicle length as much as possible.

Such track sections are rather rarely available in the real route network and a transport of the vehicle to a calibrated track section and thus also the calibration are linked to significant chronological, logistical, and monetary expenditure.

SUMMARY

The disclosed embodiments provide a method and an associated device for calibrating the orientation of a longitudinal axis and a transverse axis of an acceleration sensor provided in a vehicle, which enable an accurate calibration to be carried out without the use of leveled track sections and thus to reduce the costs and the time expenditure for the calibration.

BRIEF DESCRIPTION OF THE FIGURES

Disclosed embodiments are explained in more detail hereinafter with inclusion of the attached figures. In the specific figures.

DETAILED DESCRIPTION

A vertical axis of the sensor is perpendicular to a transverse axis and a longitudinal axis of the sensor, which are in turn also perpendicular to one another, which results from the designations. The three axes together thus result in the coordinate system of the sensor, which is calibrated on the basis of the method in accordance with disclosed embodiments on the coordinate system of the vehicle, which is also composed of 3 axes perpendicular to one another (longitudinal axis, transverse axis, vertical axis). The method in accordance with disclosed embodiments consists of multiple operations.

In the first method operation (method operation (A)), the acceleration is measured in the direction of the longitudinal and transverse axes (longitudinal direction or transverse direction, respectively) of the sensor over the time curve while decelerating the vehicle on an arbitrarily selected route section at low velocities and at a standstill. Acceleration vectors can be formed from the acceleration curves by taking a value of the acceleration in the longitudinal direction and in the transverse direction, respectively, of the sensor at the same time in each case. The absolute value of the acceleration vector thus represents the absolute value of the measured acceleration of the vehicle at this point in time.

In a next operation (method operation (B)), an offset vector which corresponds to a measured acceleration vector at a standstill is determined. This thus contains an acceleration in the longitudinal and transverse directions of the sensor induced by a downhill slope force due to an inclination or uphill slope or downhill slope of the track section on which the vehicle is located at a standstill. If this track section is exactly level, the offset vector is thus 0 m/s². It thus represents the influence of the gravitational acceleration on the measured acceleration in the longitudinal or transverse direction of the sensor and therefore only occurs when the track section on which the vehicle is located is not level.

Subsequently, in a further method operation (method operation (C)), at least one measured acceleration vector from a point in time of the braking, thus while the vehicle is in motion, is corrected from the influence of the gravitational acceleration (downhill slope force) on the acceleration in the longitudinal or transverse direction of the sensor by the subtraction of the offset vector. The acceleration vector resulting therefrom thus corresponds to the measured longitudinal deceleration of the vehicle.

In a final operation, the coordinate system of the sensor is transformed in such a way that the at least one resulting acceleration vector points in the vehicle longitudinal direction, thus in the direction of the longitudinal axis of the coordinate system of the vehicle.

In one advantageous embodiment, for the transformation of the coordinate system of the sensor to the coordinate system of the vehicle, the angle between the longitudinal axis of the sensor and the at least one resulting acceleration vector in the plane spanned by the longitudinal axis and transverse axis of the sensor is calculated. The at least one resulting acceleration vector is the acceleration vector corrected in the operation before by the offset vector. In the case of multiple ascertained resulting acceleration vectors and the averaging thereof to form an average resulting acceleration vector, the angle between the longitudinal axis of the sensor and the average resulting acceleration vector is calculated in the plane spanned by the longitudinal axis and the transverse axis of the sensor.

Subsequently, the coordinate system of the sensor is rotated around the already calibrated vertical axis of the sensor by the calculated angle. The longitudinal axis of the sensor is thus brought into correspondence with the longitudinal axis of the vehicle and the axis was calibrated accordingly. Since by definition the longitudinal axis is perpendicular to the transverse axis, it is thus also ensured that the transverse axis of the sensor corresponds to the transverse axis of the vehicle. The method can be carried out continuously or at intervals in running operation and thus a calibration of 'the sensor can be updated continuously or at intervals.

In further advantageous embodiments, for the transformation of the coordinate system of the sensor (method operation (D)), a rotation matrix for the rotation of the coordinate system of the sensor around the vertical axis is ascertained. The rotation matrix is composed of unit vectors to be ascertained of the at least one resulting acceleration vector in the direction of the longitudinal and transverse axes of the sensor.

In at least one advantageous embodiment, before the first method operation (A), thus before the acceleration recording of the vehicle in the longitudinal and transverse directions at low velocities, a vertical axis of the sensor is calibrated on the vertical axis of the vehicle. The vertical axis of the sensor is perpendicular to both the transverse axis and also the longitudinal axis of the sensor.

It is furthermore advantageous to perform the calibration of the vertical axis of the sensor on a leveled and/or calibrated measurement track and/or at a standstill of the rail vehicle. The leveled track section does not have to be longer than the part of the rail vehicle in which the sensor is installed. Such a calibration can thus already be carried out during the completion of the rail vehicle. It can be ensured by the calibration on a leveled track section that the sensor only detects the gravitational acceleration, which solely acts in the vertical direction on the sensor. In this way, the vertical axis of the sensor can be easily calibrated.

In at least one advantageous embodiment, the at least one resulting acceleration vector ascertained in method operation (C) is located in a calibration window. The calibration window is a time window having a specified beginning and a specified end, which can both be shifted chronologically in dependence on the measured acceleration curves. Moreover, beginning and end of the calibration window can be determined, for example, by the stopping jolt of the vehicle when stopping or on the basis of specified velocity values, at which the window begins or ends. All acceleration vectors used for the calibration are located within the calibration window. In this way, sections of the braking process which could result in corruption of the calibration, for example, ranges in which the vehicle has an excessively high or excessively low velocity, can be excluded from the calibration, which improves the quality of the result.

In at least one advantageous embodiment, the acceleration curves measured in method operation (A) are filtered to eliminate possible measurement noise or other measurement errors from the acceleration curves and thus further improve the quality of the results of the calibration. Filtering by a low-pass filter which eliminates the high-frequency components of the measured acceleration curve is particularly advantageous.

In at least one further advantageous embodiment, in method operation (C), more than only one resulting acceleration vector is ascertained. Subsequently, the individual ascertained resulting acceleration vectors are averaged. The transformation of the coordinate system then takes place on the basis of the average resulting acceleration vector, so that it points in the vehicle longitudinal direction, thus in the direction of the longitudinal axis of the vehicle. Such an embodiment has the advantage that multiple acceleration vectors within the calibration window are taken into consideration, whereby measurement inaccuracies in individual acceleration vectors corrupt the result less strongly. Moreover, in this way possibly existing slight differences in the inclinations of the tracks in the longitudinal or transverse direction (uphill slopes or raised tracks, respectively) can be compensated for during the calibration window.

In a further advantageous embodiment, the offset vector in method operation (B) is formed via averaging of various detected acceleration vectors. The acceleration vectors are composed of a component in the longitudinal direction and a component in the transverse direction of the sensor and are located within a specified offset window, which represents a time window within which the vehicle is located at a standstill and which can be specified, for example, on the basis of the stopping jolt of the vehicle. In this way, measurement inaccuracies during the standstill of the vehicle can be reduced and the most accurate possible offset vector can be ascertained.

In at least one advantageous embodiment, before the measured value recording in method operation (A), at least one precondition is checked. This reads, for example: the velocity of the vehicle is greater than a specified minimal velocity and/or the target deceleration applied by a braking system of the vehicle is greater than a specified minimum target deceleration, for example 0.8 m/s². In this way, the probability that a measured value recording creates inaccurate results can be reduced and the quality of the calibration is thus increased. If at least one of these conditions is not met, the calibration is declared invalid and aborted.

Furthermore, an embodiment is advantageous in which determined secondary conditions are checked after the measured value recording of the acceleration curves in method operation (A). For example, it can be specified as a condition that a velocity of the vehicle during the measurement of the acceleration curves is greater than a specified minimal velocity.

Further conditions could read that each of the measured acceleration vectors has an absolute value which is greater than a minimal acceleration, for example 0.6 m/s², or that the braking is carried out until the vehicle is at a standstill.

To ensure that the offset vector measured at a standstill is realistic, it can furthermore be specified as a condition that the measured offset vector cannot deviate from the gravitational acceleration by more than a specified absolute value.

Various conditions, if they do not contradict one another, can be combined with one another arbitrarily and adapted if necessary. Such an embodiment has the advantage that calibrations can be declared invalid due to unrealistic measurements by way of the set conditions and can be excluded.

In a further advantageous embodiment, it only continues after method operation (D) if the absolute values of two arbitrary resulting acceleration vectors and/or the angles thereof determined in method operation (D) do not deviate from one another by more than a specified absolute value, for example 3°. Such secondary conditions can also identify invalid or inaccurate calibrations in this case and exclude them.

In an alternative embodiment, the measured value recording along the longitudinal axis and the transverse axis of the sensor according to method operation (A) is performed during the accelerations from the standstill. The evaluation of the recorded measured values then takes place similarly to the above-described process.

In one advantageous embodiment, the method is furthermore carried out continuously or at specified intervals in regular operation of the vehicle. This has the advantage that the sensor coordinate system is continuously realigned and thus an accurate determination of the vehicle acceleration is possible at any time.

The device according to embodiments may include an operating unit which is configured to be operated by an operator and to accept commands from him. Moreover, it has a memory unit which is configured to store the data collected during the method, a processing unit which is configured to process the data collected during the method, and a data interface which is configured both to record the data detected by the sensor, and also to output data ascertained and/or processed by the device to the operator or other systems.

The computer program product in accordance with disclosed embodiments is configured to carry out disclosed embodiments to automatically and thus to ensure an automatic calibration of the sensor.

Figure 1:
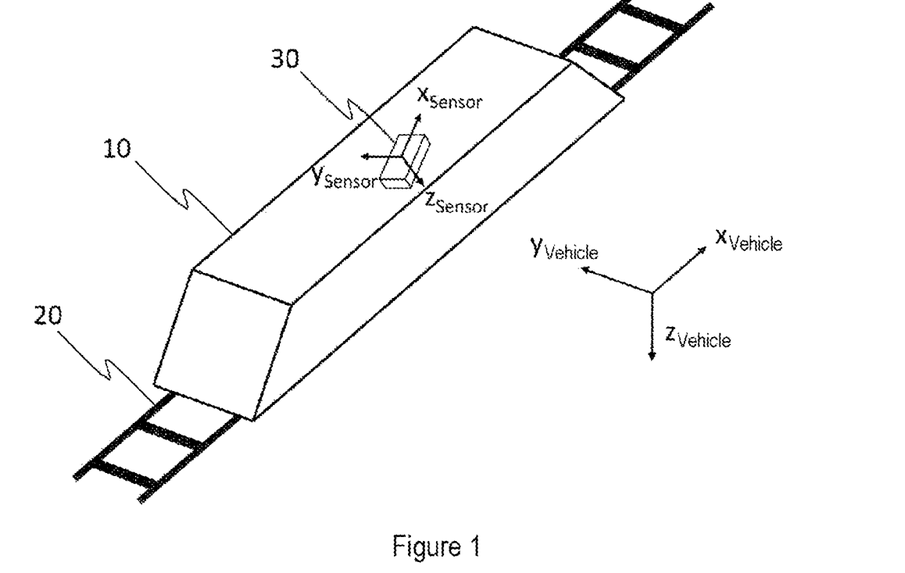
FIG. 1 schematically shows a rail vehicle and an acceleration sensor arbitrarily oriented therein.

FIG. 1 shows a rail vehicle (10) on a track (20) and having an acceleration sensor (30) installed arbitrarily oriented in the rail vehicle (10). The orientation of the coordinate system ($x_{Sensor}$, $y_{Sensor}$, $z_{Sensor}$) of the sensor (30) does not correspond here to that of the coordinate system ($x_{Vehicle}$, $y_{Vehicle}$, $z_{Vehicle}$) of the rail vehicle (10). To detect an acceleration of the vehicle (10) in its longitudinal direction ($x_{Vehicle}$) or transverse direction ($y_{Vehicle}$) using the acceleration sensor (30), the coordinate system of the sensor (30) first has to be calibrated on the coordinate system of the vehicle. This means that the corresponding coordinate axes of the respective coordinate systems have to be oriented parallel to one another. For this purpose, it is defined that the x axis of the sensor ($x_{Sensor}$) is to correspond to the x axis of the vehicle ($x_{Vehicle}$), thus the vehicle longitudinal axis, the y axis of the sensor ($y_{Sensor}$) is to correspond to the y axis of the vehicle ($y_{Vehicle}$), thus the vehicle transverse axis, and the z axis of the sensor ($z_{Sensor}$) is to correspond to the z axis of the vehicle ($z_{Vehicle}$), thus the vehicle vertical axis.

For this purpose, first the vertical axis $z_{Sensor}$ of the sensor is calibrated on the vertical axis $z_{Vehicle}$ of the vehicle. The part of the vehicle in which the acceleration sensor is installed is placed on a leveled track section, which does not have raised tracks or inclination and is thus completely level. The acceleration detected by the acceleration sensor in this state corresponds here to the known gravitational acceleration, which exclusively acts in the vertical direction of the vehicle. The coordinate system of the sensor can thus be aligned in such a way that the vertical axis of the sensor is oriented parallel to the vertical axis of the vehicle.

Subsequently, the calibration of the two remaining axes $x_{Sensor}$ and $y_{Sensor}$ of the sensor on the longitudinal and transverse axis, respectively ($x_{Vehicle}$ and $y_{Vehicle}$), of the vehicle is performed. For this purpose, in operation or during a startup journey of the vehicle, the acceleration curves of the sensor in the x or y direction are detected and evaluated during the braking process in a velocity range having low velocities and at the following standstill. Influences of curve radii of the tracks which are possibly traveled through can be reduced by the evaluation in the low velocity range. The sensor signals are not used in the system before a successful calibration.

Figure 2:
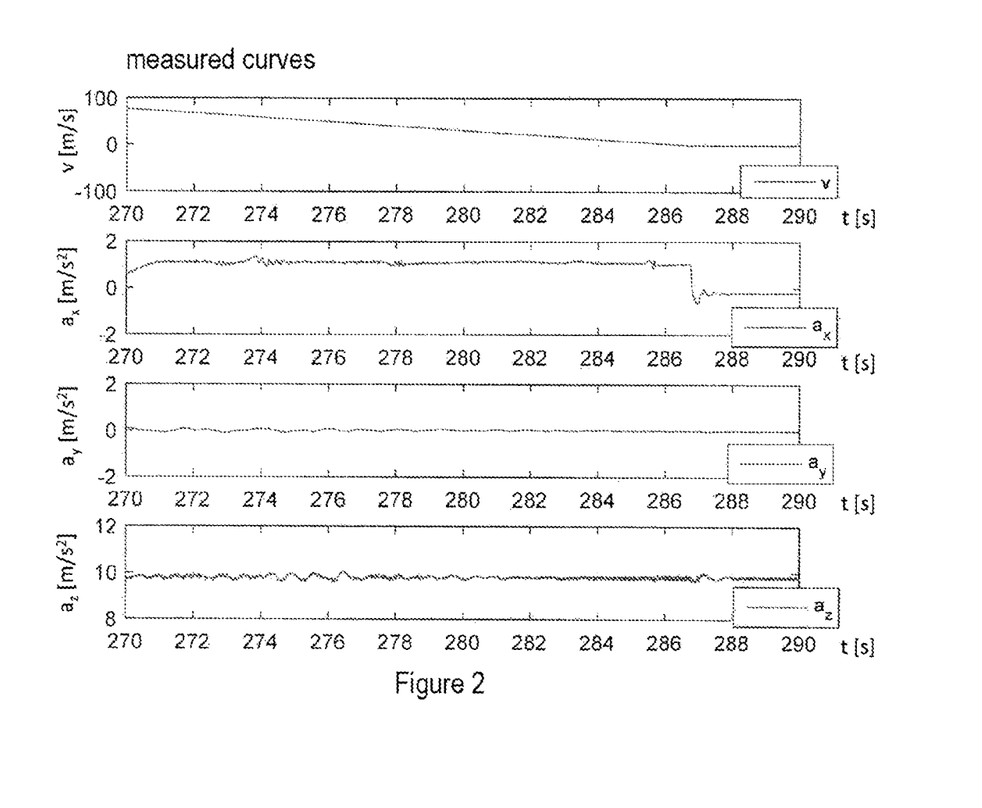
FIG. 2 shows measured curves of the acceleration sensor in its three coordinate axes and an associated measured velocity curve.

FIG. 2 shows the measured acceleration curves in the three coordinate directions ($x_{Sensor}$, $y_{Sensor}$, $z_{Sensor}$) of the sensor and the associated velocity curve over time. The velocity of the vehicle decreases linearly, while the acceleration curves are approximately constant with the exception of braking beginning and reaching a standstill. The curves thus represent a braking process of the vehicle having nearly constant deceleration. The deceleration in the x direction of the sensor is significantly greater in comparison to the deceleration in the y direction. To be able to process the data better, they are filtered with the aid of a low-pass filter which eliminates the high-frequency components of the curves, which can possibly arise due to measurement noise, for example.

The evaluation begins with the definition of a calibration window and an offset window. Start and end of the two windows can be defined here, for example, via the starting or stopping jolt of the vehicle. The duration of the time window can additionally be set as a function of the measurement results or the track conditions. The definition of the calibration window can take place here so that the start of the calibration window is defined by a specified time period, for example 5 s, before the point in time of the detected stopping jolt. The end of the calibration window is then determined by a second specified smaller time period, for example 1 s, before the point in time of the stopping jolt. The offset window can also be defined by an analogous process.

A further option for defining the calibration window is to specify specified threshold values for the velocity of the vehicle, at which the calibration window begins or ends. For example, it can be defined that the window begins when the vehicle travels at a velocity of 2 m/s and the window ends when the vehicle travels at a velocity of only 0.5 m/s.

Figure 3A:
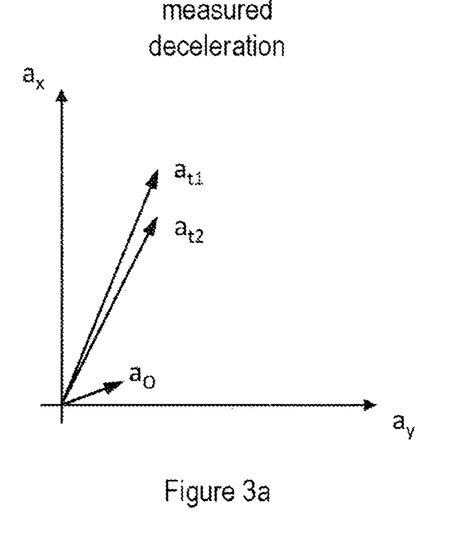
FIG. 3a shows three measured acceleration vectors at different points in time during the braking and at a standstill of the vehicle for the calibration of the acceleration sensor

Exclusively the curves within the two windows are used for the calibration of the sensor. Acceleration vectors, which are composed of an x component and a y component at the same point in time, are formed both in the calibration window and also in the offset window. In FIG. 3a, two acceleration vectors $a_{t1}$ and $a_{t2}$, which represent the accelerations at two different points in time, are illustrated as examples for this purpose for the measured acceleration vectors from the calibration window.

Figure 3B:
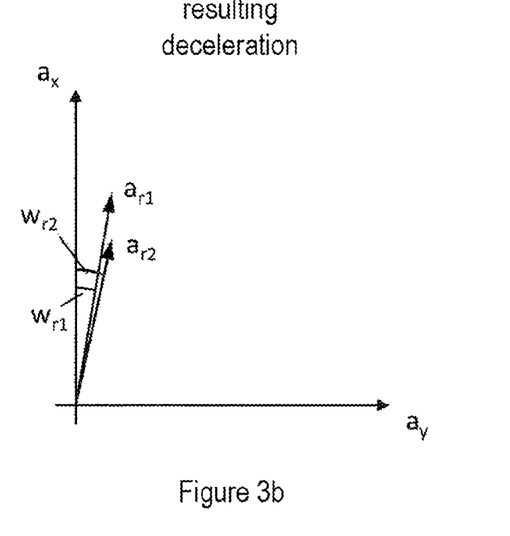
FIG. 3b shows two acceleration vectors corrected by the offset vector

The measured acceleration vectors from the offset window are averaged to thus obtain an offset vector $a_O$ (see FIG. 3a) which eliminates the static influence of the uphill slope/inclination or transverse inclination (raised track) of the track due to the gravitational acceleration. This offset vector $a_O$ is subsequently subtracted from the measured acceleration vectors ($a_{t1}$ and $a_{t2}$ in FIG. 3a) to thereby obtain resulting acceleration vectors ($a_{r1}$ and $a_{r2}$ in FIG. 3b), which thus exclusively correspond to the braking force in the longitudinal direction $x_{Vehicle}$ of the vehicle.

Figure 4:
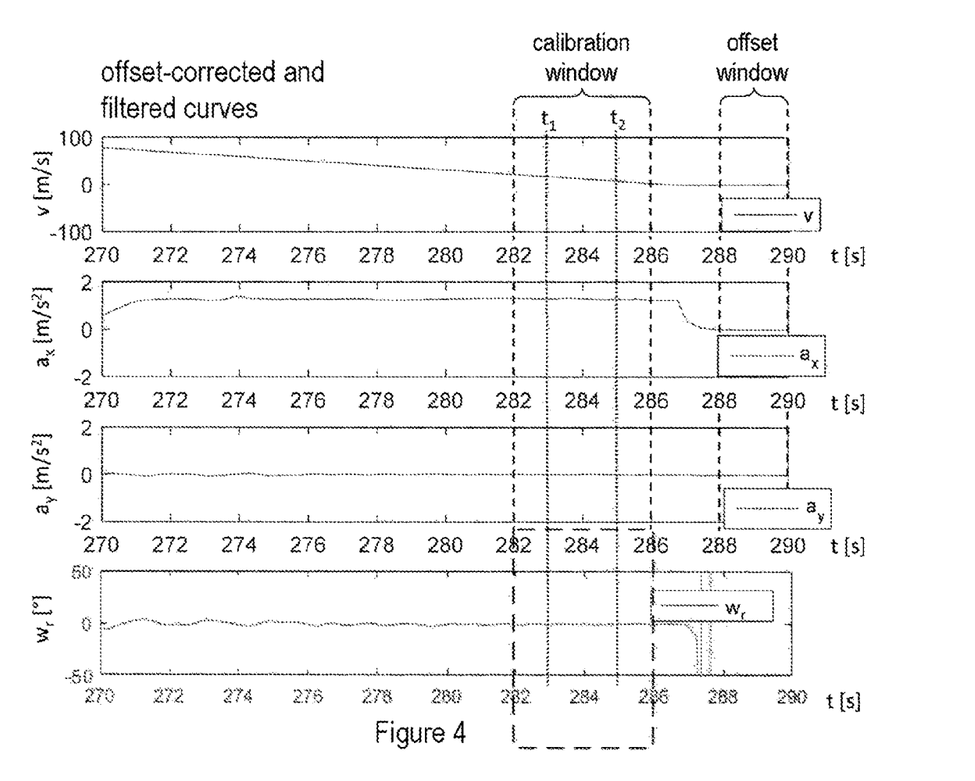
FIG. 4 shows the curves of the accelerations from FIG. 2 measured by the acceleration sensor, which were filtered by a low-pass filter and corrected by the offset vector

FIG. 4 shows the same acceleration curves as FIG. 2, however, the curves shown in FIG. 4 are filtered by a low-pass filter and already offset corrected by subtracting the offset vector. Moreover, the fourth diagram no longer represents the curve of the acceleration in the z direction of the sensor as in FIG. 2, but rather shows a curve of an angle which will be described in more detail hereinafter. In the curves, both the calibration window and also the offset window are shown. Within the calibration window, the two points in time $t_1$ and $t_2$ are indicated as examples in accordance with the vectors in FIGS. 3a and 3b.

After the formation of the resulting acceleration vectors within the calibration window, for each resulting acceleration vector $a_r$ ($a_{r1}$ and $a_{r2}$ in FIG. 3b), an angle $w_r$ ($w_{r1}$ and $w_{r2}$ in FIG. 3b) is determined, by which the associated acceleration vector deviates from the x axis of the sensor, which is to be calibrated on the longitudinal axis of the vehicle.

The curve of the angle $w_r$ over time is shown in the last diagram of FIG. 4. As can be seen, the angle $w_r$ assumes a comparatively small value in the example shown, which may be caused by the high component of the measured acceleration in the x direction in comparison to the component in the y direction. By averaging all angles $w_r$ thus obtained within the calibration window, an average value $w_m$ can be calculated, by which the coordinate system of the sensor has to be rotated around its z axis (vertical axis) so that the orientation of the x axis of the sensor corresponds to the longitudinal axis of the vehicle. The coordinate system of the sensor is calibrated on the coordinate system of the vehicle by this rotation.

Figure 5:
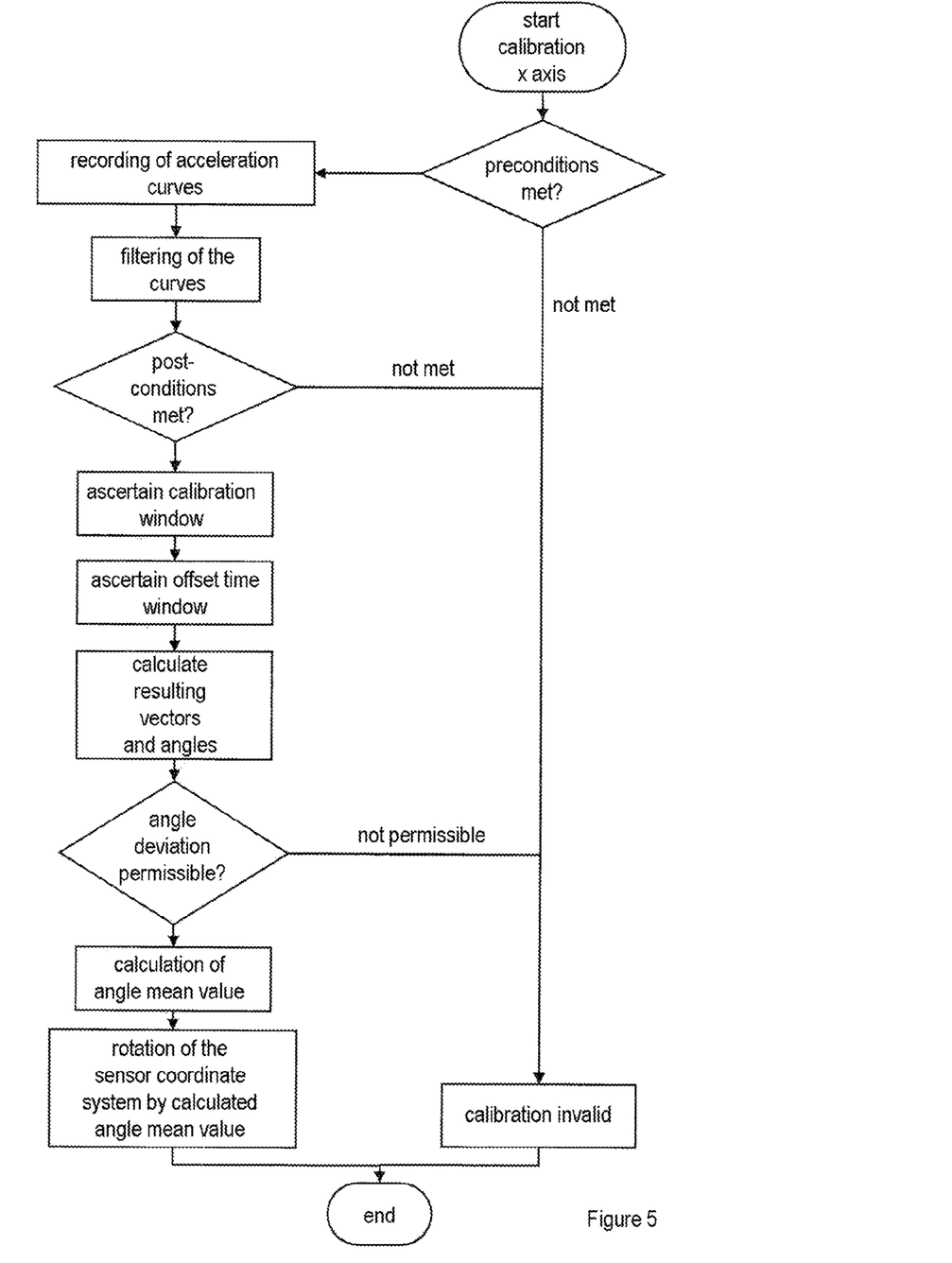
FIG. 5 shows a flow chart to illustrate the sequence of an embodiment of the method in accordance with disclosed embodiments.

FIG. 5 shows a flow chart for the calibration of the x axis of an acceleration sensor on the longitudinal axis of a rail vehicle according to at least one embodiment.

After the start of the calibration of the x axis, which can be triggered by an operator or automatically by the system by a predetermined condition, it is first checked whether the preconditions for an x axis calibration are met. These are, for example, whether the calibration of the z axis $z_{Sensor}$ of the sensor on the vertical axis of the rail vehicle $z_{Vehicle}$ has already taken place, the velocity v of the vehicle is faster than a required minimal velocity $v_{min}$, or the target deceleration applied by the braking system exceeds a minimum target deceleration. If the preconditions are not met, the calibration is declared invalid and aborted.

If the preconditions are met, the recording of acceleration curves is performed in the case of a journey at low velocity during a braking process down to a standstill on an arbitrary route section by the acceleration sensor in all three coordinate directions. Subsequently thereto, the measured acceleration curves are filtered, for example, by a low-pass filter, before it is checked whether validity conditions of the measurement have been met. Such conditions (postconditions) are, for example, that the braking has to take place until a standstill of the vehicle, the absolute value of the measured acceleration vectors $a_t$ at every point in time is greater than a specified threshold value $a_{min}$, for example 0.5 m/s$^2$, or at a standstill the absolute value of the measured acceleration deviates by not more than a defined absolute value from the gravitational acceleration. If the postconditions are not met, the calibration is declared invalid and aborted.

If the postconditions are met, as described above, a calibration window and an offset window are specified, for example, in dependence on a stopping jolt. In the respective windows, acceleration vectors are determined at various points in time, which are each composed of a component in the x direction and a component in the y direction of the sensor. Subsequently, an offset vector is determined from the acceleration vectors within the offset window by averaging, which offset vector is thereupon used to correct the acceleration vectors $a_t$ from the calibration window. The resulting vectors $a_r$ thus calculated therefore represent the deceleration of the vehicle in its longitudinal direction. In the next operation, the angles $w_r$ associated with the resulting acceleration vectors $a_r$ are calculated between the x axis of the sensor and the vectors $a_r$ in the plane spanned by the x axis and the y axis.

In a further operation, it is checked whether the deviations between the resulting angles $w_r$ of two arbitrary resulting vectors $a_{r1}$ and $a_{r2}$ and the deviation of the vector absolute values respectively exceed a maximum permissible deviation. If this is the case, the calibration is declared invalid and aborted.

If the deviations are in a permissible range, the resulting angles $w_r$ are averaged and thus an average value $w_m$ is calculated. The coordinate system of the sensor is finally rotated by this angle, so that the x axis $x_{Sensor}$ of the sensor has the same orientation as the longitudinal axis of the rail vehicle $x_{Vehicle}$.

It is to be noted that a measured value recording of the acceleration curves can also be performed during an acceleration process from a standstill using correspondingly adapted boundary conditions instead of during a braking process to a standstill, without deviating from the inventive concept.

LIST OF REFERENCE SIGNS 10 train
20 track
30 sensor
$x_{Sensor}$ longitudinal direction of the sensor
$y_{Sensor}$ transverse direction of the sensor
$z_{Sensor}$ vertical direction of the sensor
$x_{Vehicle}$ longitudinal direction of the rail vehicle
$y_{Vehicle}$ transverse direction of the rail vehicle
$z_{Vehicle}$ vertical direction of the rail vehicle
v velocity of the rail vehicle
$a_x$ acceleration in the longitudinal direction of the sensor
$a_y$ acceleration in the transverse direction of the sensor
$a_z$ acceleration in the vertical direction of the sensor
t time
$a_{t1}$ acceleration vector at the point in time t1
$a_r$ resulting acceleration vector $a_O$ offset vector
$W_r$ angles of the resulting acceleration vectors
$w_m$ average angle

The invention claimed is:

1. A method for calibrating orientation of a longitudinal axis ($x_{Sensor}$) and a transverse axis ($y_{Sensor}$) of an acceleration sensor provided in a transportation vehicle having a coordinate system made up of the longitudinal axis ($x_{Sensor}$), the transverse axis ($y_{Sensor}$), and a vertical axis ($z_{Sensor}$), wherein the axes are each perpendicular to one another, the method comprising:

measuring acceleration along the longitudinal and transverse axis ($x_{Sensor}$ and $y_{Sensor}$) of the sensor during a braking process of the transportation vehicle at low velocity and at a standstill over a time curve;

determining an offset vector ($a_O$) at a standstill, wherein the offset vector ($a_O$) which is composed of a component in the direction of the longitudinal axis ($x_{Sensor}$) and a component in the direction of the transverse axis ($y_{Sensor}$) of the sensor and represents an influence of a gravitational acceleration on the measured acceleration of the vehicle;

ascertaining at least one resulting acceleration vector ($a_r$) by subtracting the offset vector ($a_O$) from at least one measured acceleration vector ($a_t$), which is composed of the measured acceleration in the direction of each of the longitudinal and transverse axes ($x_{Sensor}$ and $y_{Sensor}$) at a point in time during the low velocity, wherein the low velocity is a period of time during the braking before an identified stopping jolt; and transforming the coordinate system of the sensor, so that the at least one resulting acceleration vector ($a_r$) points in the vehicle longitudinal direction, wherein the ascertained at least one resulting acceleration vector ($a_r$) is located in a calibration window which has a specified beginning and a specified end, which is the period of time during the braking before the stopping jolt of the vehicle and the offset vector ($a_O$) is determined in an offset window which is a period of time after the stopping jolt, and wherein each resulting acceleration vector ($a_r$) used for the calibration lies within the calibration window.

2. The method of claim 1, wherein for transforming the coordinate system of the sensor an angle ($w_r$) between the longitudinal axis of the sensor ($x_{Sensor}$) and the at least one resulting acceleration vector ($a_r$) in the plane spanned by the longitudinal axis ($x_{Sensor}$) and transverse axis ($y_{Sensor}$) of the sensor is calculated and the coordinate system of the sensor is rotated around an already calibrated vertical axis of the sensor ($z_{Sensor}$) by the calculated angle ($w_r$).

3. The method of claim 1, wherein for transforming the coordinate system of the sensor, a rotation matrix for the rotation of the coordinate system of the sensor around the vertical axis ($z_{Sensor}$) is ascertained, wherein the rotation matrix is composed of unit vectors to be ascertained of the at least one resulting acceleration vector ($a_r$) in the direction of the longitudinal and transverse axes of the sensor.

4. The method of claim 1, wherein before the measuring acceleration along the longitudinal and transverse axis, a vertical axis ($z_{Sensor}$) of the sensor (30), which is perpendicular to the longitudinal axis ($x_{Sensor}$) and the transverse axis ($y_{Sensor}$) of the sensor, the method further comprises calibrating a vertical axis ($z_{Vehicle}$) of the vehicle.

5. The method of claim 1, wherein calibration of vertical axis ($z_{Sensor}$) of the sensor is performed on a leveled and/or calibrated measurement track and/or at a standstill of the vehicle.

6. The method of claim 1, wherein the ascertained at least one resulting acceleration vector ($a_r$) is located in a calibration window which has a specified beginning and a specified end, which can be shifted in time, and/or are determined on the basis of the stopping jolt of the vehicle, and wherein each resulting acceleration vector ($a_r$) used for the calibration lies within the calibration window.

7. The method of claim 1, wherein between the measuring the acceleration along the longitudinal and transverse axis and the determining of the offset vector ($a_O$) at standstill, the method further comprises filtering acceleration curves in the longitudinal and transverse directions of the sensor by a low-pass filter.

8. The method of claim 1, wherein in the determination of the offset vector at standstill, more than one resulting acceleration vector ($a_r$) is ascertained, and then angles ($w_r$) corresponding to each of the ascertained vectors are calculated, which are subsequently averaged to obtain an average angle ($w_m$), and wherein the coordinate system of the sensor is subsequently rotated by the calculated average angle ($w_m$) around an already calibrated vertical axis ($z_{Vehicle}$) of the sensor.

9. The method of claim 1, wherein in the determination of the offset vector at standstill, more than only one resulting acceleration vector ($a_r$) is ascertained and subsequently the ascertained resulting acceleration vectors ($a_r$) are averaged, wherein the transformation of the coordinate system of the sensor then takes place on the basis of the average resulting acceleration vector, so that it points in the vehicle longitudinal direction.

10. The method of claim 1, wherein the offset vector ($a_O$) is specified by averaging multiple detected acceleration vectors ($a_t$), which are recorded in an arbitrarily specified offset window, and wherein the offset window is specified by the stopping jolt of the vehicle.

11. The method of claim 1, wherein before the measuring the acceleration along the longitudinal and transverse axis, conditions are checked as to whether velocity (v) of the vehicle is greater than a specified minimum velocity ($v_{min}$) and/or target deceleration applied by a braking system of the vehicle exceeds a minimum target braking and/or the vertical axis ($z_{Sensor}$) of the sensor was already calibrated on the vertical axis ($z_{Sensor}$) of the vehicle, and if one of these conditions is not met, the calibration is not begun.

12. The method of claim 1, wherein after the measuring the acceleration along the longitudinal and transverse axis, the conditions that each measured acceleration vector ($a_t$), at every point in time during the measurement of an acceleration curve down to approaching a standstill, has an absolute value which is greater than a specified minimal acceleration ($a_{min}$) and/or that the braking is carried out until a standstill of the vehicle and/or that the absolute value of an acceleration vector ascertained at a standstill deviates by less than a specified absolute value from the gravitational acceleration, are checked and if at least one of these conditions is not met, the calibration is not continued.

13. The method of claim 1, wherein after the transforming the coordinate system of the sensor, the conditions that the absolute values of two arbitrary resulting acceleration vectors ($a_{r1}$) and ($a_{r2}$) deviate from one another by less than a specified absolute value, and/or that the angles ($w_r$) determined in the transformation of the coordinate system of the sensor of two arbitrary resulting acceleration vectors ($a_{r1}$) and ($a_{r2}$) deviate from one another by less than a specified absolute value, are checked and if at least one of these conditions is not met, the calibration is not continued.

14. The method of claim 1, wherein the method is carried out continuously or at specified intervals in regular operation.

15. A device configured to carry out the method as claimed in claim 1, having:
- an operating unit configured to be operated by an operator and to accept commands,
- a memory unit configured to store the data collected during the method,
- a processing unit configured to process the data collected during the method,
- a data interface configured both to record the data detected by the sensor and also to output data ascertained and/or processed by the device to the operator or other systems.

16. A non-transitory computer program product configured to carry out the method of claim 1 automatically.

* * * * *